United States Patent
Kopf et al.

(10) Patent No.: US 11,895,118 B2
(45) Date of Patent: Feb. 6, 2024

(54) MANAGEMENT OF COLLABORATIVE CONTENT ITEM MODIFICATION

(71) Applicant: Hyland UK Operations Limited, Maidenhead (GB)

(72) Inventors: Stefan Kopf, Maidenhead (GB); Jared Ottley, Maidenhead (GB); Brian Remmington, Wokingham (GB); Gregory Melahn, Raleigh-Durham, NC (US)

(73) Assignee: Hyland UK Operations Limited, Maidenhead (GB)

( * ) Notice: Subject to any disclaimer, the term of this patent is extended or adjusted under 35 U.S.C. 154(b) by 0 days.

(21) Appl. No.: 18/111,478

(22) Filed: Feb. 17, 2023

(65) Prior Publication Data
US 2023/0216859 A1 Jul. 6, 2023

Related U.S. Application Data

(63) Continuation of application No. 17/023,292, filed on Sep. 16, 2020, now Pat. No. 11,616,785, which is a continuation of application No. 16/176,373, filed on Oct. 31, 2018, now Pat. No. 10,812,492, which is a
(Continued)

(51) Int. Cl.
*H04L 9/40* (2022.01)
*H04L 67/10* (2022.01)
*G06F 3/0481* (2022.01)
*G06F 16/27* (2019.01)
*H04L 67/1097* (2022.01)
(Continued)

(52) U.S. Cl.
CPC .......... *H04L 63/102* (2013.01); *G06F 3/0481* (2013.01); *G06F 16/275* (2019.01); *G06F 21/6209* (2013.01); *G06Q 10/101* (2013.01); *H04L 63/123* (2013.01); *H04L 67/10* (2013.01); *H04L 67/1097* (2013.01)

(58) Field of Classification Search
CPC ..... H04L 63/102; H04L 63/123; H04L 67/10; H04L 67/1097; G06F 3/0481; G06F 16/275; G06F 21/6209; G06Q 10/101
See application file for complete search history.

(56) References Cited

U.S. PATENT DOCUMENTS

| | | | |
|---|---|---|---|
| 6,260,040 B1 | 7/2001 | Kauffman et al. | |
| 2004/0049598 A1* | 3/2004 | Tucker | H04L 67/564 707/E17.119 |
| 2006/0112124 A1* | 5/2006 | Ando | G11B 27/034 |

(Continued)

*Primary Examiner* — Beemnet W Dada
(74) *Attorney, Agent, or Firm* — Mintz, Levin, Cohn, Ferris, Glovsky and Popeo, P.C.; F. Jason Far-hadian, Esq.

(57) ABSTRACT

Systems and methods for concurrent modification of content are provided. In response to a verified request received from a user content is copied to a first storage media as a first version of the content uniquely identified by a first identifier, the verified request being based on verification of the user's credentials. In response to the user editing the first version of the content, the edited copy of the content is stored in the content management system in association with a second identifier uniquely identifying the edited copy of the content as a second version of the content. In response to receiving a notification that a plurality of users no longer request access to the content stored in the content management system, the first version of the content is deleted from the first storage media.

20 Claims, 8 Drawing Sheets

Related U.S. Application Data continuation of application No. 15/076,342, filed on Mar. 21, 2016, now Pat. No. 10,122,729.

(51) Int. Cl.
*G06F 21/62* (2013.01)
*G06Q 10/101* (2023.01)

(56) References Cited

U.S. PATENT DOCUMENTS

| | | | |
|---|---|---|---|
| 2007/0220068 A1* | 9/2007 | Thompson | G06F 16/1873 707/999.203 |
| 2007/0271303 A1* | 11/2007 | Menendez | G06F 16/1873 |
| 2012/0110445 A1* | 5/2012 | Greenspan | G06F 40/169 715/256 |
| 2014/0195593 A1* | 7/2014 | Somerfield | G06F 40/166 709/203 |
| 2015/0199319 A1 | 7/2015 | Newman et al. | |
| 2016/0378737 A1 | 12/2016 | Keslin et al. | |

* cited by examiner

| Content Name | Content No. | Version | Modified Date | Created Date | Author |
|---|---|---|---|---|---|
| ... | ... | v ... | ./././ | ./././ | ... |
| ... | ... | v ... | ./././ | ./././ | ... |
| ... | ... | v ... | ./././ | ./././ | ... |
| ... | ... | v ... | ./././ | ./././ | ... |
| ... | ... | v ... | ./././ | ./././ | ... |
| ... | ... | v ... | ./././ | ./././ | ... |
| ... | ... | v ... | ./././ | ./././ | ... |
| ... | ... | v ... | ./././ | ./././ | ... |
| ... | ... | v ... | ./././ | ./././ | ... |

FIG. 3

MANAGEMENT OF COLLABORATIVE CONTENT ITEM MODIFICATION

CROSS-REFERENCE TO RELATED APPLICATION

This application claims priority to and is a continuation of U.S. patent application Ser. No. 17/023,292 filed on Sep. 16, 2020 which claims priority to and is a continuation of U.S. patent applications with Ser. No. 15/076,342 filed on Mar. 21, 2016 and Ser. No. 16/176,373 filed on Oct. 31, 2018, the content of which is incorporated herein by reference in entirety.

COPYRIGHT & TRADEMARK NOTICES

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The subject matter described herein relates generally to content management systems and to managing the collaborative modification of content items maintained by such content management systems.

BACKGROUND

Enterprise content management (ECM) covers a broad range of applications, including document management (DM), Web content management (WCM), records management (RM), digital asset management (DAM), search of managed content, and the like. A content management system (CMS) suitable for managing the various content (also referred to herein in some examples as "files" or "documents") that an enterprise produces or generates, retains or otherwise stores, manipulates or modifies, etc. can support the requirements of one or more of such applications, and optionally other requirements, to provide a coherent solution in which content processes, management processes, and the like are capable of accessing content across a variety of applications subject to access controls, permissions, and the like. Content managed by a CMS can include one or more of documents, images, photos, Web pages, records, XML documents, other unstructured or semi-structured files, etc. Content retained in a CMS can also include directory structures such as folders, file trees, file plans, or the like, which can provide organization for multiple content items in addition to storing or otherwise representing relationships between content item, etc. An "enterprise" can generally refer to an organization, such as for example a business or company, a foundation, a university, or the like, and can have content requirements related to one or more business processes, content uses, etc.

A CMS manages the actual digital binary content, the metadata that describes a context of each content item, associations between a content item and other content or content items, a place and classification of a content item in a repository, indexes for finding and accessing content items, etc. The CMS can also manage processes and lifecycles of content items to ensure that this information is correct. The CMS can also manage one or more workflows for capturing, storing, and distributing content, as well as the lifecycle for how long content will be retained and what happens after that retention period.

A CMS for use in enterprise content management can include one or more of document management tools, applications, and interfaces to support general office work, search, and discovery. Workflow management capabilities of a CMS can support numerous business processes, optionally including, but not limited to, case management and review and approval. Collaboration applications and services of a CMS can support the collaborative development of information and knowledge in the creation and refinement of content and documents. This collaborative development of information and knowledge can be achieved through providing access to content managed by the CMS to multiple users. To prevent conflicting or discontinuous editing streams, a user can be allowed to check out or lock content for modification and check in the modified content such that other users are prevented from editing content concurrently. Web content management services of a CMS, which can be scalable, can support the delivery and deployment of content from the enterprise to its customers. Records management capabilities of a CMS can capture and preserve records based upon government-approved or other standards. A standards-based platform can also provide access to applications that use these standards, such as publishing, image management, email management, etc.

SUMMARY

As discussed in greater detail below, features of the current subject matter can enable concurrent modification of the same content managed by a CMS by multiple users separately accessing the content.

In accordance with one or more implementations, systems and methods for concurrent modification of content by multiple users is provided. In response to a verified request received from a user to access content stored in a content management system, content is copied to a first storage media as a first version of the content uniquely identified by a first identifier. The verified request may be based on verification of the user's credentials. In response to the user editing the first version of the content, the edited copy of the content is stored in the content management system in association with a second identifier uniquely identifying the edited copy of the content as a second version of the content. In response to receiving a notification that the user no longer requests access to the content stored in the content management system, the first version of the content from the first storage media is deleted.

In one implementation, content stored in a repository of the content management system may be copied to a content store in response to a request received from a first user of the content management system to access the content, the content having a unique identifier, the content store facilitating presentation of the copy of the content on a shared interface. In response to receiving the request, credentials of the first user may be provided to the content store to grant the first user access to the content stored in the content store.

In response to receiving a second request from a second user to access the content, credentials of the second user may be provided to the content store to grant the second user access to the content stored in the content store. The copy of the content at the repository of the content management system may be received. The received copy may reflect results of editing of the copy of the content by at least one of the first user or the second user using an editor external to the content management system. The edited content in the repository of the content management system may be stored with a second unique identifier. The second unique identifier may indicate that the received copy of the content is a version of the content.

In one variation, the request from the users may be verified and a copy of the content has been transmitted to the content store may be identified. The content stored in the content repository of the content management system may include associated restrictions on access to the content. It may be verified that providing access to the content for the user complies with the restrictions on access to the content. The content stored in the content repository of the content management system may include one or more attributes.

In accordance with one aspect, attributes of the content stored in the content repository of the content management system may be modified to prevent modification of the content in response to transmitting the copy of the content to the content store. The one or more attributes of the content stored in the content repository of the content management system may be modified to permit modification of the content in response to receiving the edited content from the content store.

An indication from one or more of a plurality of users that they have completed their modification of the content stored in the content store may be received. Further, an indication that at least one user of a plurality of users editing the content stored in the content store has completed their edits of the content may be received, in response to the at least one user suspending operation of the shared interface.

In accordance with one or more aspects, subsequent to the collaborative modification of the content, the features of the current subject matter may facilitate synchronization of the modified content between repositories managed by separate installations of a content management system. In some implementations, on-premise content maintained by or otherwise retained in an on-premise repository (optionally protected by one or more firewalls) can be synchronized with a cloud copy of that content maintained by or otherwise retained in a second repository managed by a cloud-based installation of the CMS.

In one aspect, methods including one or more operations, systems for performing one or more operations, computer program products configured to a processor(s) to perform one or more operations, for managing content, is provided. The one or more operations can include copying content stored in a repository of the content management system to a transient content store. The content can be copied in response to a request received from a user of the content management system to access the content. The content can have a unique identifier. The transient content store can facilitate presentation of the copy of the content on a shared interface.

The one or more operations can include receiving the copy of the content at the repository of the content management system. The received copy can reflect results of editing of the copy of the content by the user using an editor external to the content management system.

The one or more operations can include storing the edited content in the repository of the content management system with a second unique identifier. The second unique identifier can indicate that the received copy of the content is a version of the content.

The one or more operations can include receiving a log-in request from the first user to access the content stored in the content repository of the content management system. The log-in request can be verified from the first user. Log-in credentials of the first user can be provided to the transient content store to gain access for the first user to the content stored in the transient content store.

The one or more operations can include receiving a log-in request from a second user to access the content stored in the content repository of the content management system. The log-in request of the second user can be verified. The operation(s) can include identifying that a copy of the content has been transmitted to the transient content store. Log-in credentials of the second user can be provided to the transient content store to gain access for the second user to the content stored in the transient content store.

The content stored in the content repository of the content management system can include associated restrictions on access to the content. The operation(s) can comprise verifying that providing access to the content for the first user complies with the restrictions on access to the content.

The content stored in the content repository of the content management system can include one or more attributes. The operation(s) can include modifying the one or more attributes of the content stored in the content repository of the content management system to prevent modification of the content in response to transmitting a copy of the content to the transient content store. The operation(s) can include modifying the one or more attributes of the content stored in the content repository of the content management system to permit modification of the content in response to receiving the edited content from the transient content store.

An indication from one or more of the plurality of users that they have completed their modification of the content stored in the transient content store can be received.

An indication that at least one user of the plurality of users editing the content stored in the transient content store has completed their edits of the content can be received in response to the at least one user suspending operation of the shared interface.

A notification can be transmitted to the transient content store to delete the copy of the content on the transient content store in response to the content management system receiving the edited content from the transient content store. The notification can be transmitted in response to receiving an indication that the plurality of users editing the content stored in the transient content store have terminated their access to the content stored in the transient content store.

Implementations of the current subject matter can include, but are not limited to, methods consistent with the descriptions provided herein as well as articles that comprise a tangibly embodied machine-readable medium operable to cause one or more machines (e.g., computers, etc.) to perform operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise software system or other content management software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 shows a screen view illustrating features of an interface that can be provided to a user on a client device associated with the user consistent with implementations of the current subject matter;

DETAILED DESCRIPTION

One or more current features of the current subject matter can enable concurrent modification of content managed by a CMS by multiple users. The CMS can be configured to enable multiple users to separately access the same content and modify the content using an external editor. Users can modify mirrored copies of the content to preserve the content stored on the CMS until modification of the content has been completed. The mirrored copies of the content can be stored on electronic storage media associated with the external editor.

Figure 1:
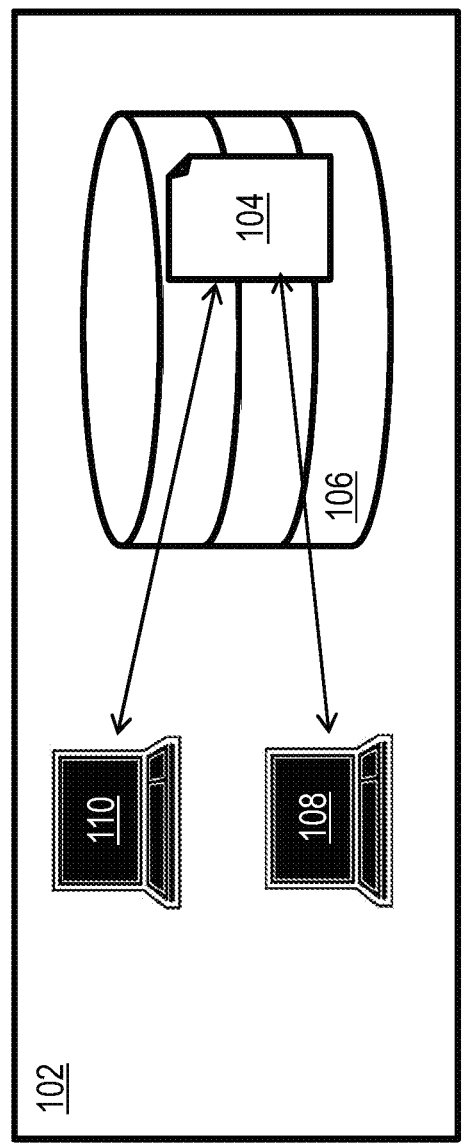
FIG. 1 shows a diagram illustrating features of a CMS architecture consistent with implementations of the current subject matter.

FIG. 1 shows a diagram 100 illustrating features of a CMS architecture 102 consistent with implementations of the current subject matter. A typical enterprise may own or otherwise manage or have custodial responsibility for content 104 subject to a range of access controls. Some content 104 of the enterprise may be freely sharable, while some other content 104 may be highly confidential or otherwise subject to security control. However, a third type of content 104 of the enterprise may exist somewhere between these two extremes. Some of the content 104 may require collaboration between multiple users concurrently. However, some examples of a CMS 102 may not include the capability to allow editing or other modification of content 104 by multiple users concurrently, and in particular by multiple users concurrently from within an online document modification editor having its own document store to which a document maintained by the CMS 102 must be "checked out" for editing.

Currently available approaches to enterprise content management generally do not include capabilities relating to linking and synchronizing content that is being concurrently modified by more than one user. It is typical for content 104 that is managed by a CMS 102 of an enterprise to be stored on electronic storage 106. In response to a first user 108 accessing the content 104, the CMS 102 can be configured to lock the content 104 from further edits by other users. If a second user 110 accesses the content 104 and makes modifications, the second user 110 can be prohibited from saving the modified content over the original content 104. Instead, the second user 110 can be permitted to save the modified content as a new version of the original content 104. The CMS 102 can be configured to permit the first user 108 to save any modified content over the original content 104 or to cause the modified content to be saved as a new version of the original content 104.

Having multiple versions of the content 104 that have been modified out of synch with one another can cause continuity and consistency problems with the content 104. Additionally, when content 104 is modified using an external document editor, such as for example an online (e.g. "cloud hosted") version of a word processor such as Microsoft Word (available from Microsoft Corp. of Redmond, WA), content controls of currently available CMS installations may require that only a single user be able to access the content 104 while the content 104 is provided to a content store associated with the external document editor.

As referred to herein, a content management system generally includes at least one programmable processor executing some form of machine-readable instructions (e.g. software code, etc.) to provide one or more content management functions. Alternatively or in addition, computer hardware can be configured to perform one or more of the operations or the like described herein. The term firewall is generally used throughout this disclosure to refer to network security controls, features, functionality, etc. that restrict access to users outside of the firewall to content retained on one or more repositories inside of that firewall. The term content is generally used throughout this disclosure to mean folders, files, directory structures, or the like (also referred to herein as content items).

Various implementations of the current subject matter can, among other possible benefits and advantages, provide the ability to concurrently modify content by multiple users.

Concurrent modification of content can be facilitated for users who are either inside an enterprise firewall or external to the enterprise firewall.

Although the examples described herein refer to a CMS installation, an enterprise can maintain multiple CMS installations or collaborate with other enterprise CMS installations. The current subject matter can be configured to synchronize one or more of folders, files, directory structures, or the like, and business processes from a first installation of a CMS to a second CMS installation. Access restrictions on content items can be mirrored on the other CMS installations. Collaborations on content items can be facilitated between multiple on-premise users as well as users external to the premises at which the CMS installation is maintained. The variations of the subject matter described in this disclosure refer to two users modifying content simultaneously. This is for ease of explanation. The current subject matter contemplates multiple users concurrently modifying the content. The current subject matter can facilitate modification of the content by one, two, three, four, five or more users, or groups of users, concurrently.

Services and controls for managing content of a CMS consistent with implementations of the current subject matter can include features such as metadata management, version control, lifecycle management, workflow, search, associations to other content, tagging, commenting, etc. that allow users of the CMS to find desired content items among very large content collections that can span multiple parts of an enterprise. Accuracy and consistency of the information can also be ensured, even for very large content collections across an enterprise. Content and other information in a CMS can be presented, published, etc. through the Web or any other channel appropriate to allow users to access that information.

In addition to supporting features typical of a cloud-based or "software as a service" (SaaS) software delivery model, a synchronization scheme consistent with the descriptions provided here can provide a number of desirable features. For example, the current subject matter can support automatic synchronization of content between one or more CMS-managed repositories that are inside of a firewall and a copy of one or more content items that are made accessible to authorized collaborating users of the collaboration site in the cloud. Such features can enhance ease of engagement and collaboration both between users within an organization and other collaborating users who are external to the organization.

As described in greater detail below, synchronization can be supported for individual and multiple files, folders, folder hierarchies, and other directory structures between the "on-premise" and "cloud-based" repositories.

The term user is used throughout this disclosure to refer to a user of the system, a user terminal used by a user to access one or more elements of the system, or the like.

Figure 2:
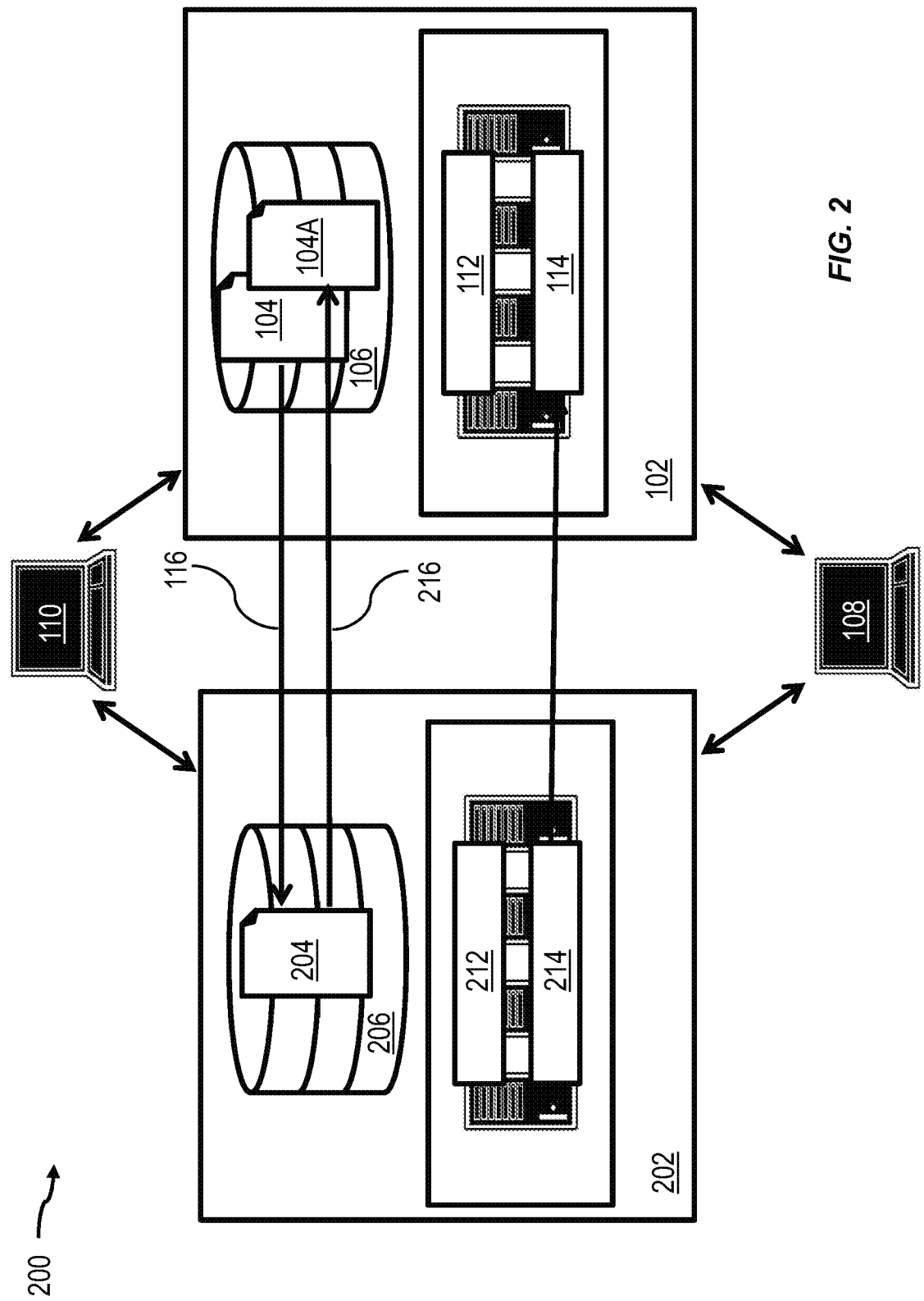
FIG. 2 shows a diagram illustrating features of a system architecture for facilitating collaborative modification of content managed by a CMS that may relate to one or more implementations of the current subject matter.

As an illustrative example, FIG. 2 shows a diagram illustrating features of a system architecture 200 for facilitating collaborative modification of content 104 managed by a CMS that may relate to one or more implementations of the current subject matter. The CMS architecture 102 can be maintained by the enterprise. Content 104 can be stored on a data storage system 106. The data storage system 106 can include one or more data storage systems, one or more hard drives, flash memory, RAM, optical storage, or any other kind of information storing device. A server 112 can be configured to manage the content 104 of the CMS architecture 102. The CMS 102 can include a permissions log 114. The permissions log 114 can include information as to the access rights of users to content 104. The permissions log 114 can include a list of users of the system 200 and their respective permissions. The permissions log 114 can include a list of users that can access certain content items 104. The permissions log 114 can include a list of content items and the users that can access them. In some variations, each content item 104 can include a permissions log including a list of users and their respective access rights to the content item 104.

The enterprise can maintain a collaborative working system (CWS) 202. The CWS 202 can include a data storage system 206. The data storage system 206 can include one or more data storage systems, one or more hard drives, flash memory, RAM, optical storage, or any other kind of information storing device. The data storage system 206 can be configured to store content items 204. The CWS 202 can be configured to include a server 212 configured to manage the content items 204 stored on the data storage system 206 of the CWS 202. The CWS 202 can facilitate a collaborative environment. The collaborative environment can be configured to facilitate concurrent modification of content items 204 by multiple users. The CMS 102 can be configured to transmit the permissions log 114 from the CMS 102 to the CWS 202. A permissions log mirror 214 can be maintained by the CWS 202.

In one use case, a user 108 can request access to content 104 stored on the data storage system 106 managed by the CMS architecture 102. The server 112 associated with the CMS 102 can be configured to cause transmission of a copy of the content 104 to the CWS 202. The copy of the content 104 can be stored as a modifiable content item 204 on the data storage system 206 associated with the CWS 202. The copy of the content 104 can be transmitted from the CMS 102 to the CWS 202 through one or more transmission channels 116, which can include one or more of wired, wireless, optical, etc. data connections. The CMS 102 and the CWS 202 can be logically and/or physically separated and/or logically and/or physically co-located.

The CMS 102 can lock the content 104 from being edited further while a copy 204 of the content 104 is available for modification through the CWS 202. The user 108 can be presented with the content 204 through a display of a user device associated with the user 108. The content 204 can be transmitted from the CWS 202 to the user 108 through one or more communication networks. In some variations, the content 204 can be transmitted from the CWS 202 to the user 108 through the CMS 102. The CMS 102 generally requires log-in credentials from the user 108 as does the CWS 202. In some implementations, the CMS 102 can be configured to provide the log-on credentials of the user 108 to the CWS 202, providing the user 108 access to the CWS 202 without requiring a direct log-in of the user 108 to the CWS 202, a concept generally known as SSO (single signon). This SSO feature of the CMS 102 facilitating authentication of a user to the CWS 202 can occur transparently to the user 108 (which can refer to any user of the CMS 102).

The CMS 102 can receive a request from a second user 110 to access the content 104 managed by the CMS 102. The content 104 can be locked for modification because it is currently in use by the user 108 through the CWS 202. The second user 110 can be barred from accessing and/or modifying the content 104; provided access to a separate instance of the content 104; and/or, provided access to the mirrored copy content item 204 on the CWS 202. In some variations, the second user 110 can be granted access by the user 108 to participate in modification of the mirrored content 204 managed by the CWS 202.

As with the first user 108, the second user 110 can be provided access to the mirrored content 204 by transmitting the mirrored content through one or more transmission lines. The mirrored content 204 can be provided to the second user 110 over communication connections between the CWS 202 and a user device associated with the second user 110.

The second user 110 can be presented with the content 204 through a display of a user device associated with the second user 110. The content 204 can be transmitted from the CWS 202 to the user device of the second user 110 through one or more communication networks. In some variations, the content 204 can be transmitted from the CWS 202 to the user device of the second user 110 through the CMS 102. The CMS 102 can require log-on credentials from the second user 110. The CWS can require log-on credentials from the second user 110 before granting access to the content 204 to the second user 110. In some implementations, the CMS 102 can be configured to provide the log-on credentials of the second user 110 to the CWS 202, providing the second user 110 access to the CWS 202 and the content 204 on the CWS 202.

FIG. 3 is an illustration of an interface 300 provided to a user on a client device associated with the user. The interface 300 can be provided to a user on a client device in response to a log-on request received at the CMS 102 from the user. The log-on request can include user credentials, or alternatively, the user credentials can have been previously provided (e.g. for a user is already signed into the CMS 102). The CMS 102 can be configured to verify the user credentials against a user record managed and/or maintained by the CMS 102 or one or more associated components. In response to verification of the user credentials, the CMS 102 can be configured to provide access, by the verified user, to the one or more content items 104 maintained by the CMS 102. Access to the one or more content items 104 can be selective, based on a user's access status for individual ones and/or groups of the one or more content items 104.

In some variations, the CMS 102 can be configured to facilitate presentation of an indication 302 of one or more content items 104 on the interface 300 to the user. Presentation of the indication 302 of the one or more content items 104 can be provided to the user in response to verifying that the user has appropriate access rights to those one or more content items 104. The CMS 102 can be configured to store metadata associated with the content items 104. The metadata associated with the content items 104 can be arranged in one or more fields 304 or otherwise retained in a database that properly associates metadata with the proper content item 104. The CMS 102 can be configured to facilitate searching and/or filtering of the content items 104. Searching and/or filtering of the content items 104 can be based on the information contained in the metadata associated with the content items 104 and/or with content within the content items 104. The indication 302 of the one or more content items 104 can be presented to the user in response to the CMS 102 receiving one or more search terms from the user.

The graphical user interface 300 can be configured to receive input by the user. For example, the user can select one or more content items 104 through the graphical user interface 300. In response to selection and/or entry of the one or more content items 104 by the user, the CMS 102 can be configured to provide access for the user to the one or more content items 104. In response to selection and/or entry by the user of the one or more content items 104, the server 112 associated with the CMS 102 can be configured to cause transmission of a copy of the selected content 104 to the CWS 202 in the manner described above. As described above, the user credentials provided to the CMS 102 can be transmitted to the CWS 202 in response to selection and/or entry by the user of the one or more content items 104. Verification of the user's credentials can be performed by the CWS 202. Access to mirrored content item 204 can be facilitated in response to verification of the user's credentials as described above.

The CWS 202 can be configured to verify user credentials against a mirrored permissions log 214. The mirrored permissions log 214 maintained by the CWS can include the same permission information as the permissions log 114 maintained by the CMS 102. In some implementations, where the CMS 102 manages the user's access to both the content 104 and the mirrored content 204, the CMS 102 can be configured to grant access to the instances of the mirrored content 204 to users based on the permission log 114.

Figure 4:
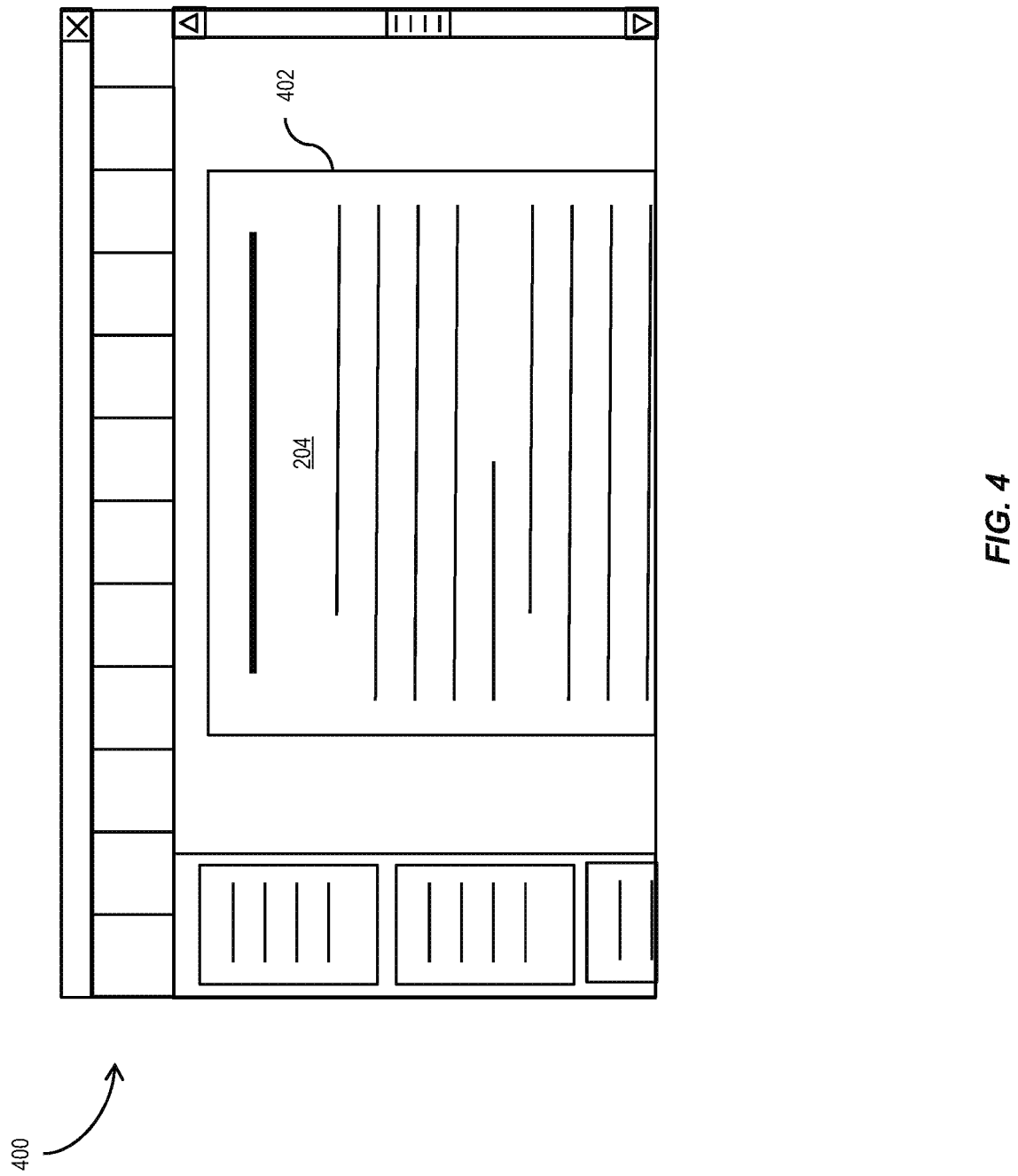
FIG. 4 shows a screen view illustrating features of an interface that can be provided to a user on a client device associated with the user consistent with implementations of the current subject matter.

The mirrored content item 204 can be transmitted from the CWS 202 to the CMS 102. The CMS 102 can be configured to facilitate presentation of the mirrored content item 204 to the user. FIG. 4 is an illustration of an interface 400 provided to a user on a client device associated with the user in accordance with one or more elements of the current subject matter. The interface 400 presented to a user on a client device can be configured to present an instance 402 of the mirrored content 204 to the user through a display associated with a client device. From the user's perspective, when the user enters and/or selects an indication of one or more content items 104 presented in the interface 300, the one or more mirrored content items 204, corresponding to the one or more content items 104 can be presented to the user without the user accessing the CWS 202 themselves. The interface 400 provided to the user can facilitate modification of the mirrored content item 204. The modification of the mirrored content item 204 can be facilitated through a content editor. The content editor can be external to the CMS 102. An instance of the interface 400 can be a visual representation of the content editor. The content editor can be managed by the CWS 202. The instance of the interface 400 can be transmitted from the CWS 202 to the user through the CMS 102.

Individual instances of interface 400 can be presented to individual users who request access to one or more content items 104 through interface 300. In some variations, the second user 110 can be provided an instance of the mirrored content 204. The instance of the mirrored content 204 provided to the second user 110 can be the same instance of the mirrored content 204 provided to the first user 108. The first user 108 and the second user 110 can provide modifications to the instance of the mirrored content 204 presented to them through user devices associated with the first user 108 and the second user 110.

Separate instances of the mirrored content 204 can be provided to user devices of the first user 108 and the second user 110. Modifications made by the first user 108 in the instance of the mirrored content 204 through interface 400 presented to the first user 108 can be reflected in the instance of the mirrored content 204 provided to the second user 110 through interface 400 presented to the second user 110.

The CWS 202 can be configured to maintain the changes made by the first user 108 and/or the second user 110 to the mirrored content item 204 on the data storage system 206 associated with the CWS 202. The CWS 202 can update the mirrored content item with all changes made by the first user 108 and/or the second user 110. The CWS 202 can be configured to facilitate updating of the mirrored content item 204 in response to each modification provided by the first user 108 and/or the second user 110. In some variations, the CWS 202 can be configured to facilitate updating of the mirrored content item 204 periodically during the period that the mirrored content item 204 is being edited by the first user 108 and/or the second user 110.

In the event that a first user 108 and a second user 110 attempt to make edits to the same portion of the mirrored content item 204 at the same time, the CWS 202 can be configured to only allow the edits from the user that started editing that portion first. A notification can be provided to other users when they try to edit that portion of the mirrored content item 204 that it is unavailable for edit. The notification can take the form of the portion of the mirrored content item 204 having a visual variation compared to the rest of the mirrored content item 204. For example, the portion of the mirrored content item 204 can be given a different color, the edits being made can be shown, in real time, or the like.

In some variations, when multiple users attempt to edit the same portion of the mirrored content item 204 at the same time, the CWS 202 can be configured to accept edits from users based on a set of editing priority rules. The editing priority rules can include an instruction that the first user to start editing has priority over all other users trying to edit the same portion of the mirrored content item 204. The editing priority rules can include a hierarchy of users. The CWS 202 can be configured to give priority to edits from users having a higher priority. For example, if a user of low hierarchy is editing a portion of the mirrored content item 204 and a user of a higher hierarchy starts to edit the same portion, the CWS 202 can be configured to ignore the edits made by the user of low hierarchy and instead accept the edits made by then user of high hierarchy.

The aforementioned methods for dealing with multiple users making inconsistent edits to the same portion of a mirrored content item 204 are not intended to be limiting. Many rules and systems can be implemented depending on the nature of the work performed with the content items.

The CWS 202 can be configured to detect when the first user 108 and/or the second user 110 has ceased modifying the mirrored content item 204. The first user 108 and/or the second user 110 can cause an indication that they have ceased modifying the mirrored content item 204 by logging off of the system 200, disengaging from the system 200, closing one or more applications provided by the CWS 202 to facilitate modification of the mirrored content item 204, selecting a control or other user interface action to explicitly check in the mirrored content item 204, and/or other ways to indicate that the user has ceased making modifications to the content using the CWS 202.

In some variations, the CWS 202 can be configured to maintain the mirrored content item 204 in editable form as long as one user is still modifying an instance of the mirrored content item 204. The CWS 202 can be configured to detect when no users are modifying the mirrored content item 204. In response to determining that no users are modifying the mirrored content item 204, the CWS 202 can be configured to transmit the mirrored content item 204 (now modified) to the CMS 102. The CWS 202 can be configured to transmit the mirrored content item 204 to the CMS 102 over one or more communication networks 216. In response to receiving the mirrored content item 204 from the CWS 202, the CMS 202 can be configured to store the mirrored content item 204 as a new content item version 104A.

In some variations, the CWS 202 can be configured to store a log of the changes made to the mirrored content item 204. The log of the changes made to the mirrored content item 204 can be transmitted to the CMS 102. The CMS 102 can maintain a change log between the item content 104 and the version of the item content 104A.

In some variations, the CWS 202 may delete content item 204 once the content item has been transmitted to CMS 102 and stored as content item 104, when no users are modifying the mirrored content item 204. The content item 104 would then be re-transmitted back to CWS 202 as needed (for example, if another collaborative editing session starts later).

Figure 5:
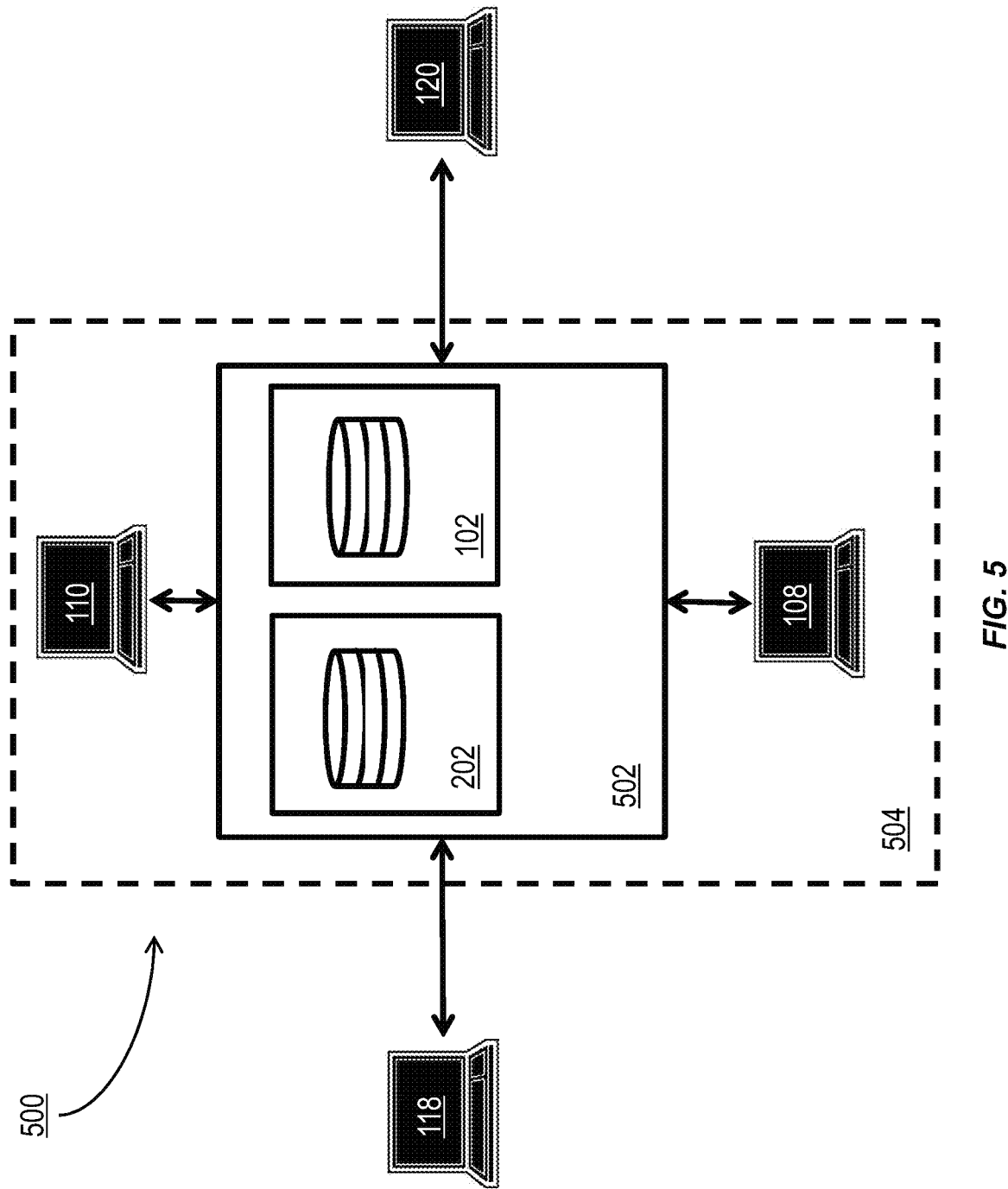
FIG. 5 shows a diagram illustrating features of a system architecture for facilitating collaborative modification of content managed by a CMS that may relate to one or more implementations of the current subject matter.

FIG. 5 shows a diagram illustrating features of a system architecture 500 for facilitating collaborative modification of content managed by a CMS 102 relating to one or more implementations of the current subject matter. In some variations an enterprise can maintain a system 502. The system 502 can be contained within a firewall 504. The system 502 can include a CMS 102 and a CWS 202. The CMS 102 and the CWS 202 can be physically and/or logically located within the firewall 504 and/or physically separate and logically located within the firewall 504.

The system 502 can be configured to communicate with user devices within the firewall 504 as well as outside of the firewall 304. For example, the system 502 can be configured to facilitate concurrent collaborative modification by one or more users within the firewall 504, such as user 108 and/or or user 110, with one or more users outside of the firewall 504, such as user 118 and/or user 120. Users outside of the firewall can access the system 502. Communication between the users outside of the firewall and the enterprise system 502 can be encrypted. Users outside of the firewall can collaboratively modify content on the CMS 102 by way of the CWS 202 in a similar manner to users inside of the firewall as described with respect to FIG. 2.

The CWS 202 can include multiple content items being modified by multiple users or groups of users concurrently. The mirrored content items can have associated metadata that includes information about the mirrored content items. The metadata associated with the mirrored content items can be transmitted to the CMS 102. The metadata can facilitate matching of the mirrored content items from the CWS 202 with the content items of the CMS 102.

Tenant-isolated access refers to a multi-tenancy arrangement in which an installation of a software application runs on a server (or multiple servers) to support multiple client-organizations (tenants). Multi-tenancy differs from multi-instance architectures where separate software instances (or hardware systems) operate on behalf of different client organizations. The CMS 102 and the CWS 202 can be configured as tenant-isolated access. The CMS 102 can support multiple client organizations. In some variations, the CWS 202 can support multiple client organizations. In other variations, individual CWSs can be provided for individual client organizations. The CWS 202 can be a virtual system implemented on one or more virtual servers. The one or more virtual servers can be hosted on servers that are logically combined. The one or more virtual servers can be hosted on servers that are logically separate. The one or more virtual servers can be implemented on the one or more servers 112 supporting the enterprise CMS 102.

Each of multiple client organizations can optionally work with a customized virtual application instance supported by one of multiple tenants. Data in the one or more repositories 206 that are specific to a given tenant of the multiple tenants are accessible only to authorized users of that tenant. Given this definition of a multi-tenancy arrangement, it will be readily understood that references herein to a cloud-based repository are intended to refer broadly to data accessible to and isolated within a tenant of a multi-tenant implementation of a software-as-a-service offering of a software application, which in this example is a content management system. Such a tenant can optionally be further partitioned to include discrete sites (e.g. collaboration sites) to which various users can be granted desired access permissions (e.g. read, write, delete, create, etc.)

Referring again to FIG. 1, the CMS 102 can be cloud-based. The cloud-based CMS can include cloud-based repository. The cloud-based CMS can be isolated to provide access only to authorized users of a specific location within the cloud-based installation. The first user 108 and the second user 110 are authorized users.

Referring again to FIG. 2, the mirrored content item 204 managed by the CWS 202 can include both the content of the content 104 managed by the CMS 102 as well as a set of common metadata. One way in which content items can be linked is through definition of a synchronization set indicating which content items 204 and 104 are to be linked and also a destination to which they are to be linked. The destination can be a location such as a tenant or optionally a more granular definition e.g. a site, a folder, a file, etc.

Updating the content item 104 of the CMS 102 with the modified content item 204 of the CWS 202 can occur automatically. Communications necessary to ensure updating of the content item 104 of the CMS 102 can be initiated from CMS 102. Alternatively, communications necessary to ensure updating of the content item 104 of the CMS 102 can be initiated from the CWS 202. Exchange of the information can occur over secure communication channels, such as for example HTTPS connections or the like.

Consistent with some implementations of the current subject matter, updating the CMS content item 104 with the CWS content item 204 can include establishing authentication between the CMS 102 and the CWS 202.

Figure 6:
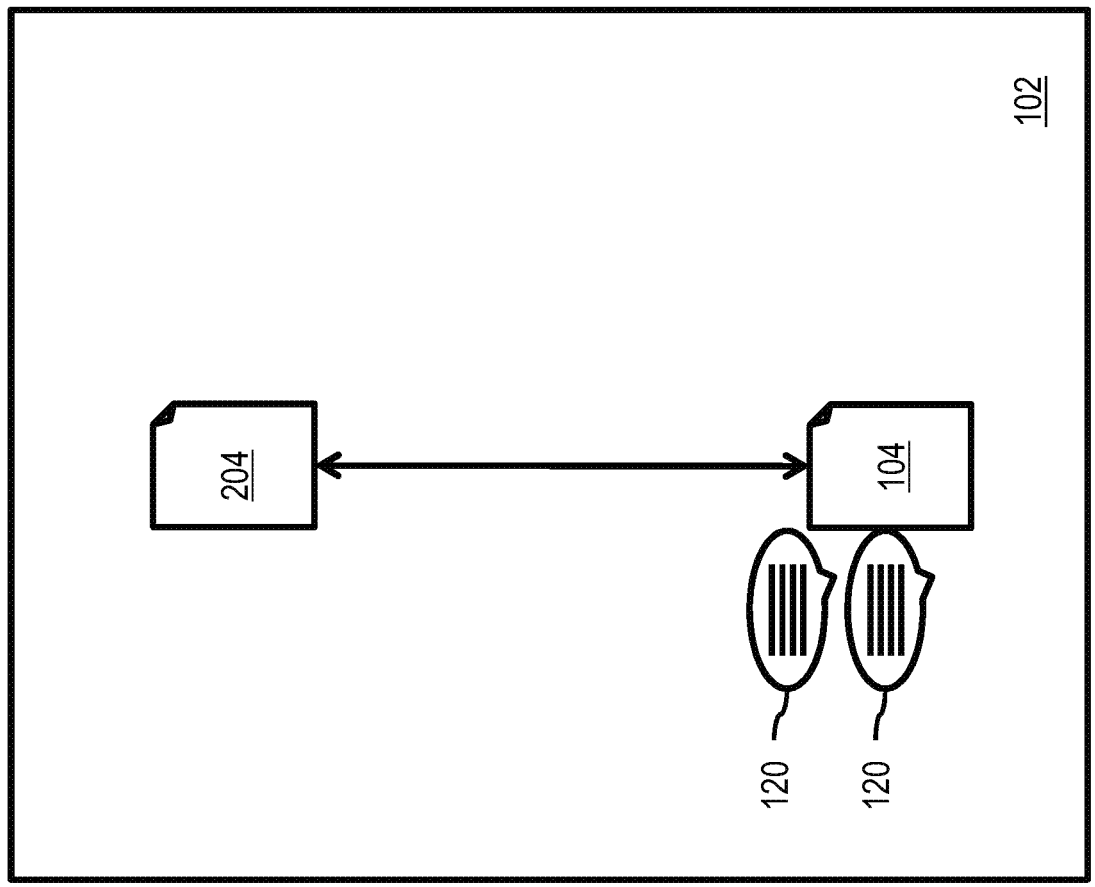
FIG. 6 shows a diagram of a CMS illustrating features that may relate to one or more implementations of the current subject matter.

As illustrated in FIG. 6, updating of the content item 104 managed by the CMS 102 with the modified content item 204 managed by the CWS can include the CMS 102 receiving metadata. The CMS 102 can store the modified content item 204 as a version of the content item 104 managed by the CMS 102. The metadata received from the CWS 202 can include information describing the modifications made to the content item 104.

Consistent with some implementations of the current subject matter, changes occurring to content item 204 managed by the CWS 202 can be aggregated such that a "final" state of the modified content item 204 can be transmitted from the CWS 202 to the CMS 102. This "final" state of the content item 204 at each push event can be retained as a version of the content item 104 on the CMS 102 to the extent that any changes have occurred since the previous push communication. Versions need not be created for each interim state of the CWS content item 204. However, a version of the content item 104 managed by the CMS 102 can be explicitly created each time it is transmitted from the CWS to the CMS, even if the change includes only a property change (for example, a change in the metadata).

If the content item 204 being modified through the CWS 202 is part of a folder or directory structure, then the folder or directory structure of the CMS 102 can be updated based on modifications made to the content item 204. In some variations, only those elements of the folder or directory structure that have been modified at the CWS 202 need be updated on the CMS 102. In other variations, the entire folder or directory structure can be updated.

Other features consistent with implementations of the current subject matter can address error handling in the event of a communication failure between the CMS 102 and the CWS 202. When transmission of a modified content item 204 to the CMS 102 fails, an error aspect can be applied to the on premise content item 104. The error can be transient (e.g. a temporary communications failure, an authentication failure, etc.) or a more "permanent" hard error that require a user interaction to solve (e.g. a name conflict in the sync folder or a permissions change meaning that a target folder is no longer writable). In either of those cases, an appropriate error aspect (e.g. indicative of a transient error or a hard error) is applied to the CMS content item 104, and the user can be notified through one or more user interface indicators (e.g. in a document library screen). When a transient error occurs, the audit log continues to keep a record of changes such that the system automatically recovers when the transient error is resolved. The audit log can continue to record changes to the content item 104 during the transient error, and these changes can be pulled back to a previous version, or a latest version upon resolution of the transient error.

In response to a transmission error, the CWS 202 can be notified of the transmission error associated with the modified content item 204. The CWS 202 can be configured to store version of the modified content item 204 that had been transmitted. Once the error has been resolved the modified content item 204 managed by the CWS 202 can be transmitted to the CMS 102.

Figure 7:
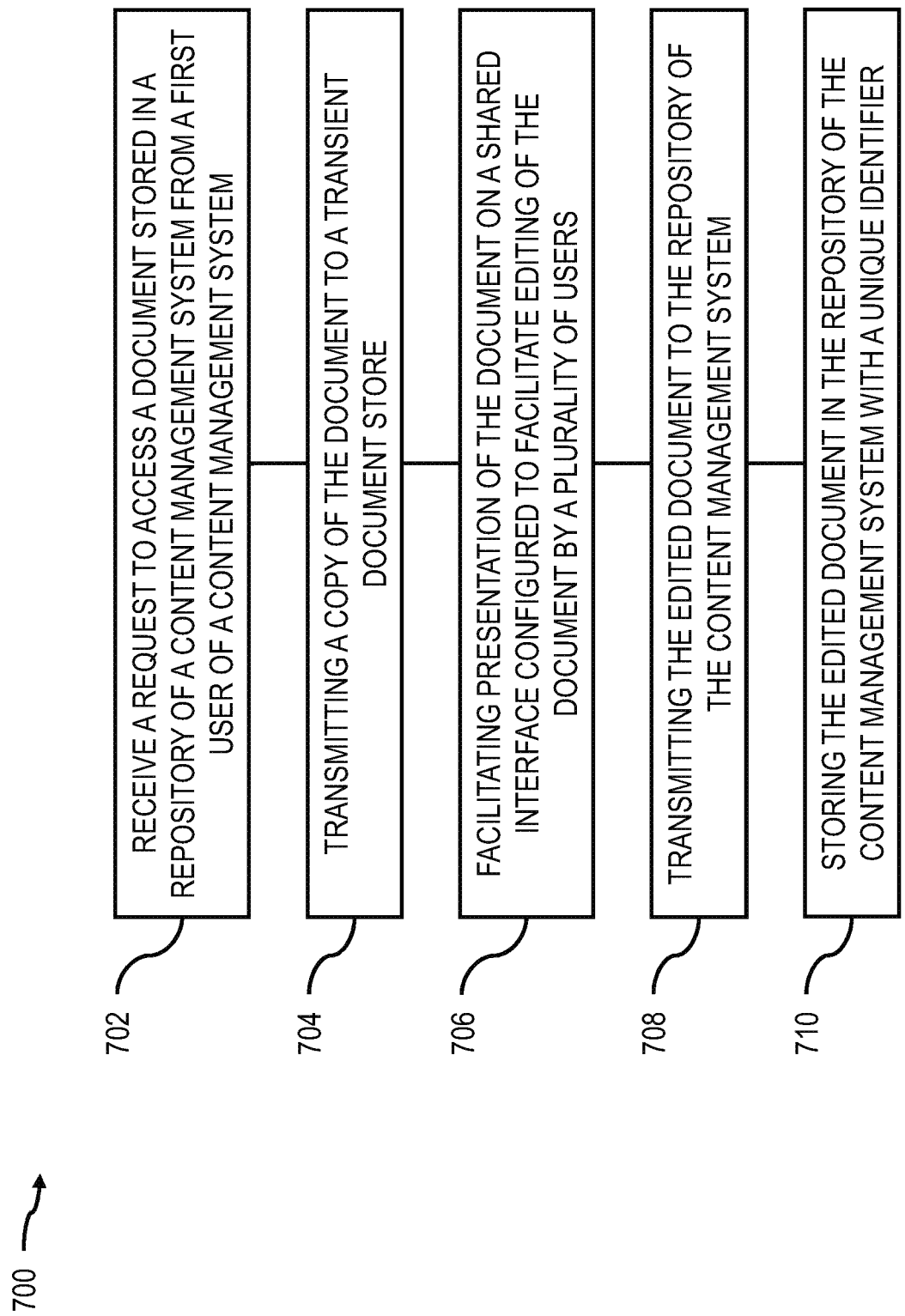
FIG. 7 shows a process flow chart illustrating features that can be included in a method consistent with implementations of the current subject matter; and, FIG. 8 shows a process flow chart illustrating features that can be included in a method consistent with implementations of the current subject matter.

FIG. 7 shows a process flow chart 700 illustrating features that can be included in a method consistent with implementations of the current subject matter. The method can be executed by one or more processors. At 702 a request can be received at a content management system. The request can be from a user to access content stored in a repository of the content management system. The content can have a unique identifier. The content can be a document stored in a document repository. The content can be a folder structure or a directory structure.

At 704, a copy of the content can be transmitted to a transient content store. The transient content store can be logically separate from the content management system repository. In other variations, the transient content store can be logically co-located with the content management system repository. The transient content store and the content management system repository can be both within a firewall. The transient content store and the content management system repository can be logically and/or physically located on either side of a firewall.

At 706, presentation of the content can be facilitated to one or more users. Presentation of the content can be facilitated on a shared interface to a plurality of users. The shared interface can be configured to facilitate editing of the content by the plurality of users. The shared interface can refer to a common instance of an application configured to facilitate modification or editing of the content. The common instance of the application can be displayed to users on user devices associated with the user, on a display of the user device. The shared interface can include an interface that multiple users participate in using. The shared interface can include multiple instances of the application configured to facilitate concurrent modification of content. The multiple instances can each be executed on a computer. The multiple instances can synchronize between the multiple instances in response to receiving an indication that one user has made an amendment to the content. In some variations, a blend of solutions for the shared interface can be provided.

Generally speaking, the shared interface can facilitate concurrent editing of a document by multiple users. Edits made to a document by a first user can be presented automatically to other users who are concurrently editing that document. The other users can be accessing the document through different user devices. An indication of the edits made by the first user can be transmitted to the user devices of the other users so that the other users can see the first user's edits.

At 708 the edited content can be transmitted to the repository of the content management system.

At 710, the edited content can be stored in the repository of the content management system. The edited content can be stored in the repository of the content with a unique identifier. The unique identifier of the edited content can indicate that the edited content is a version of the original content. In some variations, modifications between the original content and the edited content can be stored.

Figure 8:
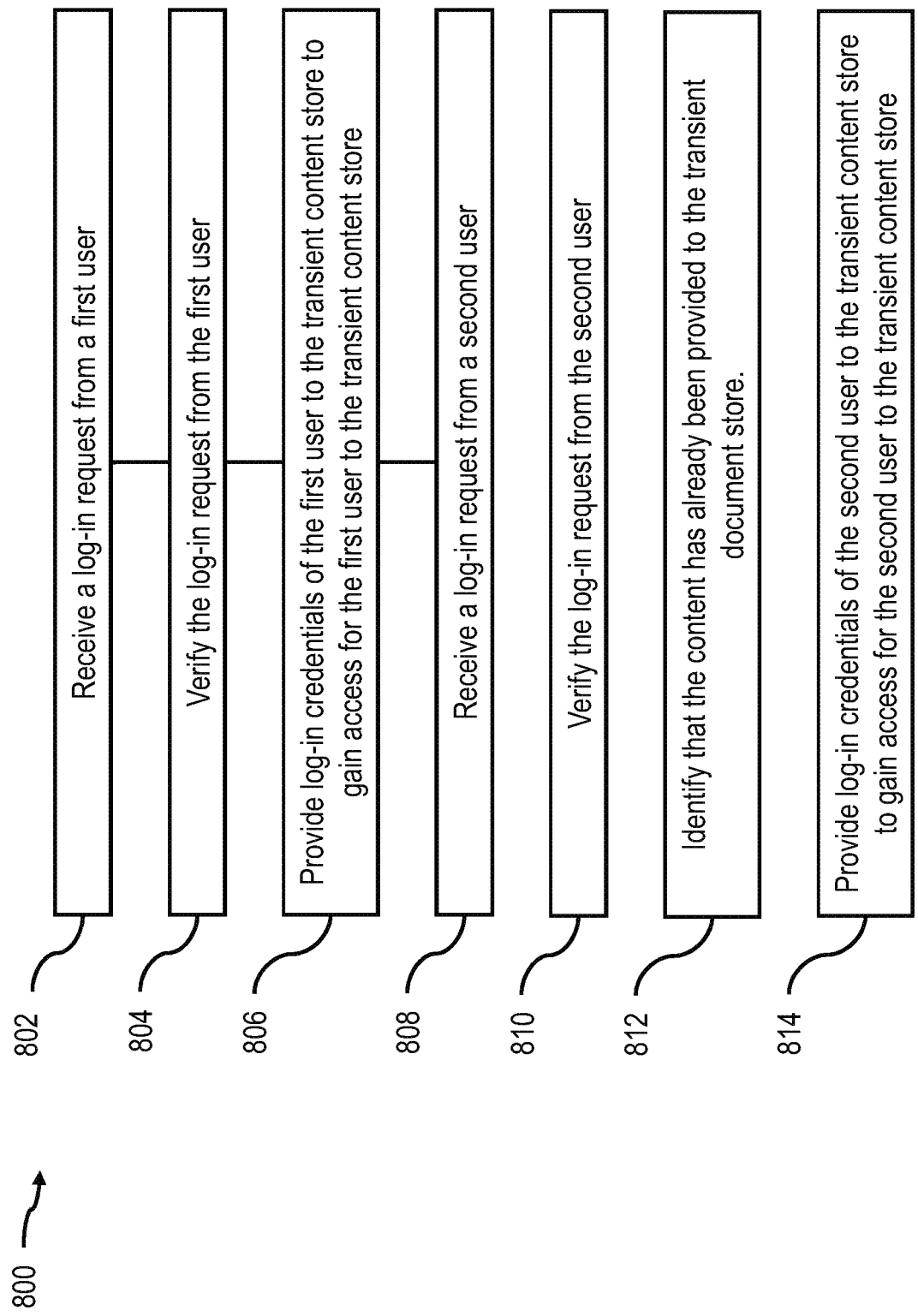

FIG. 8 shows a process flow chart 800 illustrating features that can be included in a method consistent with implementations of the current subject matter. The method can be executed by one or more processors. At 802 a log-in request can be received from a first user to access the document stored in the document repository of the content management system. The log-in request can include a request to access specified content. At 804 the log-in request from the first user can be verified. A user status with respect to the specific content can be determined for the first user. A verification can be performed to verify that the first user's user status meets the minimum requirements for accessing the specified content. At 806, in response to verifying the first-user's log-in credentials, the first user's log-in credentials can be provided to the transient document store. The first user's log-in credentials can be provided to the transient content store to grant access for the first user to the content stored in the transient content store. In some variations, after determining that the first user's user status meets the minimum requirements for accessing the specified content, the first user can be granted access to the specified content.

At 808, a log-in request from a second user can be received. The request from the second user can be for the same content accessed by the first user. At 810, the log-in request of the second user can be verified. The second user's user status can be verified. At 812, it can be identified that a copy of the requested content has been transmitted to the transient content store. Verification of whether the second user meets the minimum requirements to access the content can be made. At 814 log-in credentials of the second user can be provided to the transient document store to grant access for the second user to the content stored in the transient content store. In response to determining that the second user meets minimum requirements the second user can be granted access to the content.

The content stored in the content repository of the content management system can include one or more attributes and the operations. The one or more attributes of the content stored in the content repository of the content management system can be modified. The content can be modified to prevent modification of the content in response to transmitting a copy of the content to the transient document store. One or more attributes of the document stored in the document repository of the content management system can be modified to permit modification of the document in response to receiving the edited document from the transient document store.

An indication can be received from one or more of the plurality of users that they have completed their modification of the document stored in the transient document store. An indication that at least one user of the plurality of users editing the document stored in the transient document store has completed their edits of the document in response to the at least one user suspending operation of the shared interface.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean "based at least in part on" such that an unrecited feature or element is also permissible.

Other implementations than those described herein may be within the scope of the following claims.

What is claimed is:

1. A content management system comprising:
   a first content store for storing one or more content files for a first period of time;
      a first content file stored in the first content store having a first identifier;
   a second content store for storing one or more content files for a second period of time, the second period of time being shorter than the first period of time,
      a copy of the first content file stored in the second content store, in response to a first user modifying the first content file; and
   a credentials verification system for verifying access requests to the first content file by a second user, the first credential verification system allowing the second user to access the copy of the first content file stored in the second content store,
      the second user accessing the copy of the first content file, as modified by the first user, in response to the credential verification system examining credentials of the second user and determining that the second user has no access restrictions to the first content file stored in the first content store.

2. The content management system of claim 1, wherein the first content file stored in the first content store includes one or more attributes that prevent modification to the first content, while a copy of the first content file is stored in the second content store for the first period of time.

3. The content management system of claim 2, wherein the one or more attributes of the first content file stored in the first content store are updated to permit modification of the first content file, in response to the first user modifying content of the copy of the first content file stored on the second content store.

4. The content management system of claim 1, wherein in response to receiving a notification that the first user has completed modification of the copy of the first content file stored in the second content store, the copy of the first content file is stored in the first content store as an updated version of the first content file.

5. The content management system of claim 4, wherein the notification is received, in response to the first user suspending interaction with a shared interface allowing a plurality of users to access the copy of the first content file.

6. The content management system of claim 4, wherein the copy of the first content file on the second content store is deleted after the copy of the first content file is stored in the first content store as an updated version of the first content file.

7. The content management system of claim 4, wherein a plurality of users are provided with access to edit the first content stored in the first content store using a shared content editing interface.

8. The content management system of claim 7, wherein the shared content editing interface displays a first version of the first content file as updated by the plurality of users.

9. The content management system of claim 8, wherein content of the first content file is synchronized across multiple instances associated respectively with a plurality of devices used by the plurality of users.

10. The content management system of claim 9, wherein the first content file stored in the first content store is linked to the copy of the first content file stored in the second content store, the contents of the first content file being synchronized with updated contents of the copy of the first content file, in response to occurrence of a first event, and wherein a second content file is stored in the first content store, the second content file having a second identifier, the first identifier associated with the first content file being different from the second identifier.

11. A content management method comprising:
   storing, in a first content store, one or more content files for a first period of time, a first content file stored in the first content store having a first identifier; and
   storing, in a second content store, one or more content files for a second period of time, the second period of time being shorter than the first period of time, a copy of the first content file stored in the second content store, in response to a first user modifying the first content file, wherein a credentials verification system verifies access requests to the first content file by a second user, the first credential verification system allowing the second user to access the copy of the first content file stored in the second content store, the second user accessing the copy of the first content file, as modified by the first user, in response to the credential verification system examining credentials of the second user and determining that the second user has no access restrictions to the first content file stored in the first content store.

12. The method of claim 11, wherein the first content file stored in the first content store includes one or more attributes that prevent modification to the first content, while a copy of the first content file is stored in the second content store for the first period of time.

13. The method of claim 12, wherein the one or more attributes of the first content file stored in the first content store are updated to permit modification of the first content file, in response to the first user modifying content of the copy of the first content file stored on the second content store.

14. The method of claim 11, wherein in response to receiving a notification that the first user has completed modification of the copy of the first content file stored in the second content store, the copy of the first content file is stored in the first content store as an updated version of the first content file.

15. The method of claim 14, wherein the notification is received, in response to the first user suspending interaction with a shared interface allowing a plurality of users to access the copy of the first content file.

16. The method of claim 14, wherein the copy of the first content file on the second content store is deleted after the copy of the first content file is stored in the first content store as an updated version of the first content file.

17. The method of claim 14, wherein a plurality of users are provided with access to edit the first content stored in the first content store using a shared content editing interface, wherein the shared content editing interface displays a first version of the first content file as updated by the plurality of users.

18. The method of claim 17, wherein content of the first content file is synchronized across multiple instances associated respectively with a plurality of devices used by the plurality of users and the first content file stored in the first content store is linked to the copy of the first content file stored in the second content store, the contents of the first content file being synchronized with updated contents of the copy of the first content file, in response to occurrence of a first event, and wherein a second content file is stored in the first content store, the second content file having a second identifier, the first identifier associated with the first content file being different from the second identifier.

19. A computer program product comprising a non-transitory machine-readable medium storing instructions that, when executed by at least one programmable processor, cause the at least one programmable processor to perform operations comprising:
   storing, in a first content store, one or more content files for a first period of time, a first content file stored in the first content store having a first identifier; and
   storing, in a second content store, one or more content files for a second period of time, the second period of time being shorter than the first period of time, a copy of the first content file stored in the second content store, in response to a first user modifying the first content file,
   wherein a credentials verification system verifies access requests to the first content file by a second user, the first credential verification system allowing the second user to access the copy of the first content file stored in the second content store, the second user accessing the copy of the first content file, as modified by the first user, in response to the credential verification system examining credentials of the second user and determining that the second user has no access restrictions to the first content file stored in the first content store.

20. The computer program product of claim 19, wherein the first content file stored in the first content store includes one or more attributes that prevent modification to the first content, while a copy of the first content file is stored in the second content store for the first period of time, and the one or more attributes of the first content file stored in the first content store are updated to permit modification of the first content file, in response to the first user modifying content of the copy of the first content file stored on the second content store.

\* \* \* \* \*